Jan. 26, 1971 R. PALIES 3,558,999

CAPSULE FOR A SEMICONDUCTOR COMPONENT

Filed Feb. 14, 1968

United States Patent Office 3,558,999

Patented Jan. 26, 1971

3,558,999

CAPSULE FOR A SEMICONDUCTOR COMPONENT

Rene Palies, Bagneux, France, assignor to Compagnie General d'Electricite, Paris, France, a French corporation

Filed Feb. 14, 1968, Ser. No. 705,500
Claims priority, application France, Feb. 17, 1967, 95,510
Int. Cl. H01l 1/14
U.S. Cl. 317—234 5 Claims

ABSTRACT OF THE DISCLOSURE

Flat housing for a semiconductor device, constituted by a cylindrical wall enclosed by two collars surrounding the semiconductor, at least one of said collars bearing a through terminal for a wire connected to an auxiliary electrode of said semiconductor, said housing being disposed eccentrically with respect to the semiconductor device.

The present invention relates to a capsule for a semiconductor component.

Encapsulated power semiconductor components are known, such as thyristors for example, which are enclosed in a hermetic capsule formed by a cylindrical wall closed by two flanges surrounding the component, the system formed by the component and the capsule being arranged between two massive finned metal pieces which are in contact with the electrodes of the component and constitute radiators for dissipating the heat generated during the operation of the semiconductor component.

When the semiconductor component comprises one or several auxiliary control electrodes, as in the case of the thyristors, there arises the problem of leading the connecting wires linked with the said auxiliary electrode or electrodes out of the capsule and the radiator.

With this end in view, it has already been proposed for example to drill a radial channel into one of the electrodes to allow passage of the wire, which would then pass through one of the sealing flanges of the capsule in a hermetically insulated duct.

However, if the capsule coaxially surrounds the semiconductor element, as was the case hitherto, the sealing flanges of the capsule in question are of uniform width all around said element, which must be sufficiently great in order to accommodate the outlet duct or ducts of the connecting wires of the auxiliary electrodes.

An arrangement of this kind has two drawbacks. First of all, it needlessly increases the overall volume of the capsule, since the sealing flange of the latter will be excessively large in all radial directions, where no duct is located. Secondly, as a consequence of this increase in volume, the semiconductor element will be more remote from the fins of the radiator, which impairs the dissipation of the heat generated within the device.

The present invention has for a primary object the provision of a capsule for semiconductor components which does not suffer from these disadvantages. The capsule is essentially characterized by the fact that it is eccentric in relation to the semiconductor element. It therefore has a partial radial zone in which the sealing flange is sufficiently wide to accommodate one or several ducts, while being very narrow in the remaining radial zone located diametrically opposite thereto.

Thanks to this arrangement, the diameter of the capsule according to the invention is substantially smaller than that of a coaxial-type capsule, whose flange would have a width all around the semiconductor element corresponding to the maximum width of the flange of the eccentric capsule according to the invention.

A further consequence of this arrangement is that the fins of the radiator—with the exception of the widest region of the flange—can be located substantially closer to the semiconductor element, assuring a better dissipation of the heat evolved therein.

The invention will now be described with reference to the accompanying drawings, which illustrate the invention but in no restrictive sense.

Figure 1:
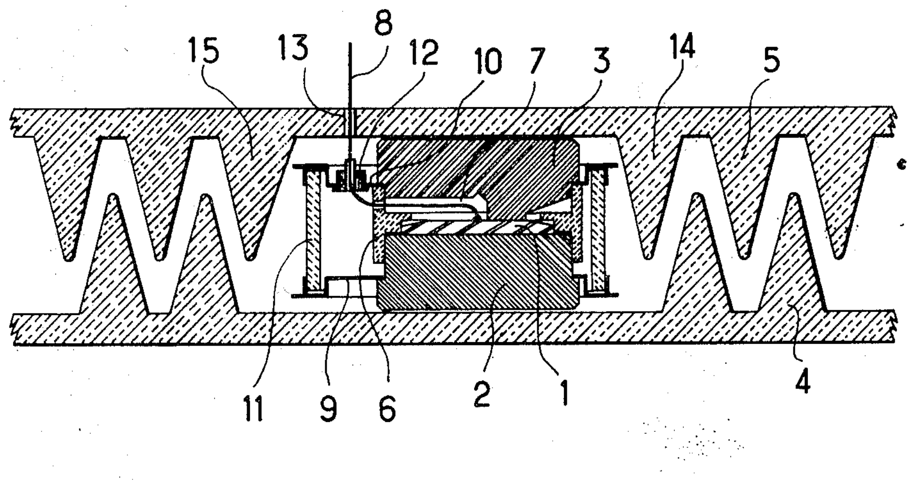
FIG. 1 is a longitudinal section of one embodiment of the invention.
Figure 2:
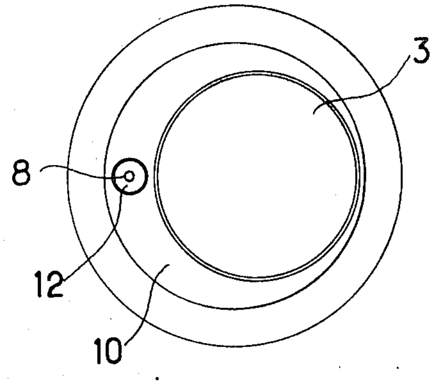
FIG. 2 is a plan view of the device of FIG. 1.

In the drawings, reference numeral 1 designates the semiconductor element proper, which is clamped between a lower principal electrode 2 and an upper principal electrode 3, which respectively carry the radiators 4 and 5 provided with fins, such as fins 14 and 15. The two electrodes 2 and 3 are centered and insulated from each other by an insulating ring 6.

The upper principal electrode 3 is pierced by a radial channel 7, which terminates opposite an orifice in the ring 6, and through which passes an insulated wire 8 forming an auxiliary electrode of the semiconductor element 1.

The drum-shaped capsule is constituted by two parallel, transversely extending flanges 9 and 10, assembled and spaced by a second peripheral insulating ring or cylindrical wall element 11. The connecting wire 8 leaves the capsule through a hermetic duct 12 provided on the flange 10, whereafter it traverses the radiator 5 through an orifice 13.

As can be seen in the figures, the capsule is eccentric relative to the semiconductor component, in order to provide on the flange 10, within a certain radial zone of the capsule, a sufficient width for accommodating one or more ducts such as 12. On the other hand, in the oppositely located radial zone the flange is much narrower, so that the cylindrical wall 11 of the capsule is much closer to the semiconductor component at this point.

It is also apparent from the drawing that the first fin 14 of the radiator, on the narrow side of the flange, is much closer to the semiconductor component than the first fin 15 on the wide face of the flange.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

What is claimed is:

1. An encapsulating structure for a semiconductor element comprising:

a cylindrical wall element eccentrically surrounding the semiconductor element, a pair of annular flanges respectively closing the ends of said cylindrical wall element, at least one of said flanges having a portion which is radially wider than the remaining portion of said flange, a pair of primary electrodes disposed so as to provide one electrode on either side of said semiconductor element extending through said flanges which are hermetically sealed to said respective primary electrodes and said wall element, and a connecting wire connected to an auxiliary electrode attached to said semiconductor element and extending through one of said flanges at the wider portion thereof.

2. An encapsulating structure for a semiconductor element as defined in claim 1 further including a pair of fixed radiators disposed on either side of said semiconductor element in contact with said primary electrodes.

3. An encapsulating structure for a semiconductor element as defined in claim 1 wherein said connecting wire passes at least in part through a duct cut into one of said primary electrodes.

4. An encapsulating structure for a semiconductor element according to claim 3, further including an insulating ring disposed between said pair of primary electrodes for centering said semiconductor with respect to said primary electrodes and to which said one of said flanges is attached and through which said connecting wire extends.

5. An encapsulating structure for a semiconductor element according to claim 4, further including a hermetic duct provided on said radially wider portion of said one of said flanges, for providing a path for said connecting wire while insulating said connecting wire from said flange.

References Cited

UNITED STATES PATENTS

| | | | |
|---|---|---|---|
| 3,328,650 | 6/1967 | Boyer | 317—234 |
| 3,457,472 | 7/1969 | Mulski | 317—234 |

FOREIGN PATENTS

| | | | |
|---|---|---|---|
| 1,234,326 | 2/1967 | Germany | 317—235 |
| 1,458,611 | 10/1966 | France | 317—235 |
| 1,466,106 | 12/1966 | France | 317—234 |

JOHN HUCKERT, Primary Examiner

R. F. POLISSACK, Assistant Examiner

U.S. Cl. X.R.

317—235